Figure 1:
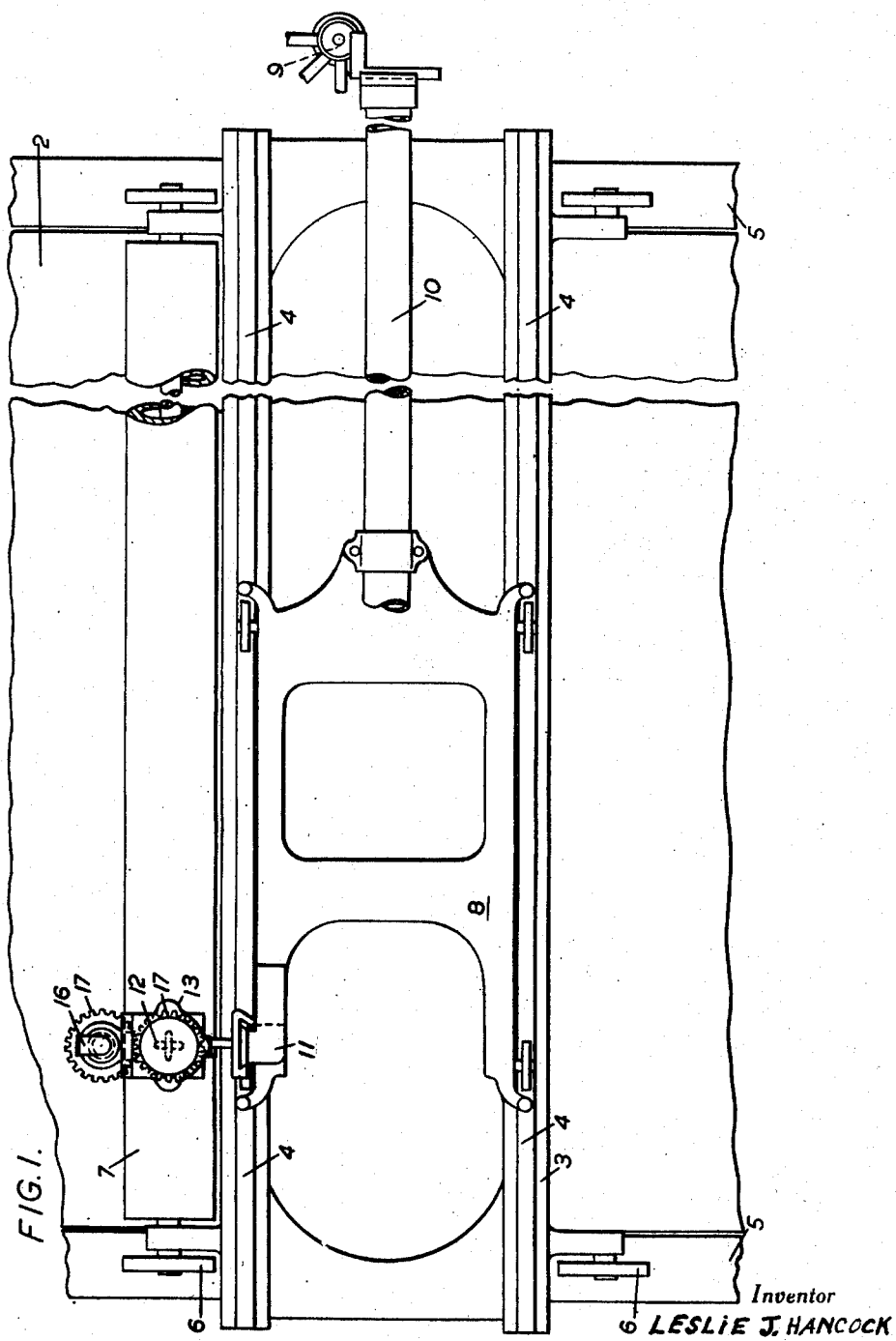

April 13, 1954   L. J. HANCOCK   2,675,224
OXYGEN JET CUTTING MACHINE
Filed Sept. 17, 1951   2 Sheets-Sheet 1

Inventor
LESLIE J. HANCOCK
By
Attorney

April 13, 1954  L. J. HANCOCK  2,675,224
OXYGEN JET CUTTING MACHINE

Filed Sept. 17, 1951  2 Sheets-Sheet 2

Inventor
LESLIE J. HANCOCK
By
Attorney

Patented Apr. 13, 1954

2,675,224

UNITED STATES PATENT OFFICE 2,675,224

OXYGEN JET CUTTING MACHINE

Leslie John Hancock, Purley, England

Application September 17, 1951, Serial No. 246,950

2 Claims. (Cl. 266—23)

My invention relates to profile oxygen cutting machines of the type used for profiling from steel plates in which the burner is mechanically moved and guided to conform to the lines of a drawing.

Cutting machines of this type are usually constructed with a supporting framework carrying a cutting burner and tracing mechanism coupled together and suspended either by a link frame or a pair of carriages to allow free and unobstructed movement of the cutting and tracing mechanism in all directions over the workpiece and drawing respectively. In the latter case one carriage carries the cutter and tracer and this is mounted on the rails carried by a second carriage which also runs on rails set at right angles to the carriage rails.

The tracer mechanism commonly used with the types of machine in question consists of a mechanically driven tracer wheel mounted on a horizontal axle which is carried in a bracket free to be turned about a vertical axis which passes through the point of contact made by the wheel on a tracing or drawing table.

To operate the machine the wheel is usually guided by hand to follow the lines of a drawing, the cutting burner tracing out a similar pattern over the plate which forms the workpiece.

The drawback to this method of tracing is that in a very short time the drawing becomes damaged by the passing of the edge of the tracing wheel over it and further tracing is rendered impossible.

A method sometimes employed which partially overcomes the difficulty, is to run the tracer wheel on the table at a distance from the drawing and to guide the wheel so that a pointer also attached to the tracer and burner carriage is moved over the lines of the drawing. This method can only be employed when the suspension is such that the position of the tracer in the horizontal plane can be varied in relation to the cutter, as for example with the double carriage suspension.

Furthermore the pointer provides no indication as to direction of travel over the drawing but this difficulty is in some cases overcome by using in place of the pointer an indicator in the form of a cross which is carried by a vertical spindle directly coupled to the vertical spindle which carries the tracer wheel bracket in such a manner that the centre of the cross coincides with its own vertical axis of rotation. One line of the cross is set to indicate the line of travel and the other, which is at right angles, to intersect at the centre of rotation. The indicator is either in the form of an illuminated cross projected by means of a lamp and lenses or in the form of cross lines cut on a glass disc and mounted just above and in close proximity to the drawing. By this method the cross turns in unison with the tracer spindle thereby giving a clear indication of the line of travel.

Another method in which the tracing wheel is offset from the drawing is in conjunction with the photo-electric follower. In this case, a spot of light is projected on to the drawing and according to the amount of light reflected so is the tracing wheel turned either to the left or right to bring the spot of light automatically centrally over the edge of a thickened line.

In any of the above cases the tracer wheel will still pass over the drawing if the latter is of greater size than the distance between the indicator and the tracer-wheel which is the case in most practical forms of construction. This especially is a disadvantage in the case of the photo-electric tracer when obliteration of the line by the passage of the tracer wheel will interrupt the guiding control of the wheel.

The object of my invention is to provide a means of driving the machine without the necessity of running the tracer wheel over the drawing thereby avoiding the disadvantages set out above.

According to the present invention a profile oxygen jet cutting machine comprises a cutter and tracing mechanism movable together in all directions over a workpiece and a drawing respectively, wherein displacement of the cutter and tracing mechanism is effected in all directions by a steerable tracer wheel bearing on a cylinder, the steering movement of said tracer wheel being controlled by means of a steering device positioned immediately over a flat drawing table and adjustable to the direction of any line of a drawing on said table.

The cylinder is either mounted on a live axle which supports a pair of wheels of a lower carriage acting as a support for an upper carriage which carries the cutter and the tracing mechanism or is coupled thereto by suitable gearing. Preferably said wheels have the same diameter as the cylinder and the tracer wheel is carried by a rotatable member coupled to means for producing a rotatable illuminated cross or to some other form of indicating device or alternatively to a photo-electric follower which is mounted directly over the drawing to be copied. This coupling is effected by a pair of spur gears when the cylinder is mounted on the live axle or by similar gears with an interposed idler when the cylinder is coupled to the wheels by gearing so that the cylinder rotates in the opposite direction to the wheels.

Using this construction the tracer wheel controls the movement of the top carriage along the lower rail carriage by the action of the wheel running along the cylinder to give transverse movement. In the longitudinal direction at right angles to this the tracer wheel will cause the cylinder to rotate and as the diameter of the cylinder is preferably the same as that of the wheels this carriage will move along the main rails at the same speed as in the transverse direction. When the tracer wheel is steered in other directions then the movement will be controlled by a combination of the two movements, the speed remaining constant. As the tracer wheel will not be in contact with the drawing no damage will be done to it and it can therefore be used indefinitely.

Figure 2:
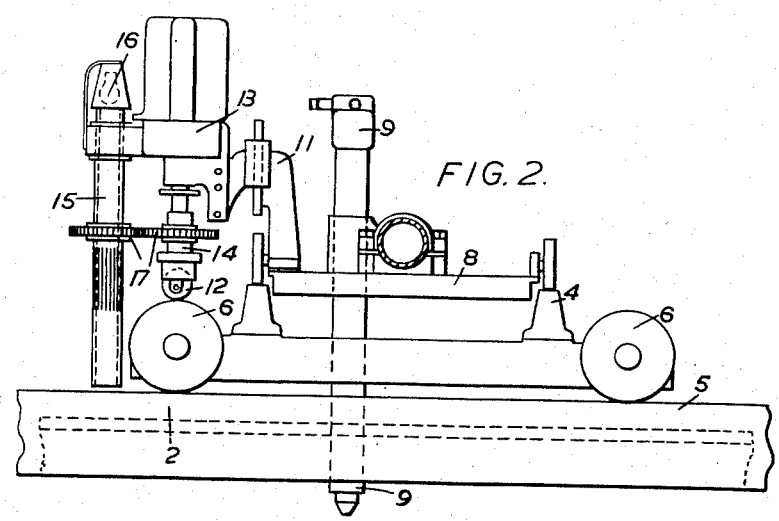
Figure 3:
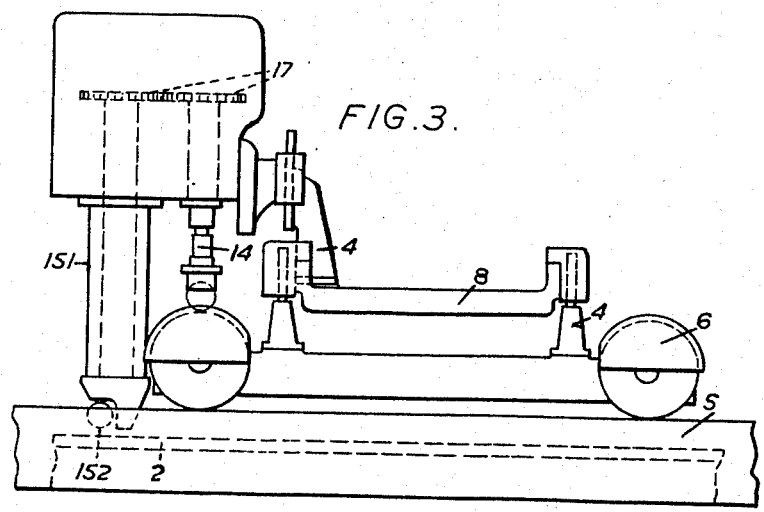

In order that the construction according to my invention can be clearly understood reference will be directed to the accompanying drawing showing a preferred form thereof by way of example in which:

Fig. 1 is a plan, Fig. 2 an end view of an oxygen cutting machine embodying the invention, and Fig. 3 is an explanatory view similar to Fig. 1 showing the photo-electric tracing device.

These drawings show a standard type of double carriage oxygen cutting machine of the type having a flat table 2 for a drawing and a lower carriage 3 which supports the transverse rails 4 designed to run in a longitudinal direction on a pair of rails 5 fixed to the main framework of the machine. The lower rail carriage is supported on two pairs of wheels 6, one pair of which is carried on a live axle on which is mounted a cylinder 7 extending to the full length of the carriage. Preferably and as shown this cylinder (which may be the outer surface of a tubular member) has the same external diameter as that of the wheels 6 associated therewith so that the peripheral speed of the surface of the tube is the same as that of either wheel.

The top carriage 8 carries the oxygen cutter elements; indicated in conventional manner by 9, through suitable means such as a cantilever tube support 10 with which there may be associated in the usual manner control means for raising and lowering the burner, for controlling the cutting oxygen flow and for similar purposes. The carriage 8 runs on the rails 4 of the lower carriage 3 and carries a bracket 11 to support a mechanically driven tracer wheel 12 vertically over and in contact with the top centre line of the cylinder 7 so that when the tracer wheel 12 is set with its axis of rotation at right angles to the long axis of the cylinder (dotted line position) the top carriage 8 will be driven along the rails 4 of the lower carriage. If the tracer wheel 12 is turned about its vertical axis through a right angle (full line position) the wheel will rotate the cylinder and with it the live axle and wheels 6 and thereby move both carriages together along the rails 5. If the tracer wheel occupies intermediate angular positions the resultant movement includes components in both directions.

It will be seen that, as the tracer wheel 12 now drives the carriage 8 indirectly through the agency of the cylinder 7 instead of directly from the drawing table, the wheel 12 must be driven in the opposite direction to that necessary if the wheel ran directly on the table.

The tracer wheel 12 is rotated about a horizontal axis by drive unit 13 vertically slidable on guideways of the bracket 11. Said unit provides for a bodily steering movement about a vertical axis, of a sleeve 14 acting as a carrier for the wheel 12 and positioned immediately over the drawing on the table 2. To control such steering movement of the wheel on the cylinder 7, an indicating cross is provided which is rotarily adjustable to the direction of any line of the drawing and through or by which the drawing lines are followed. This cross may be an optically projected image produced by a projector tube 15 rotatable about a vertical axis with its centre of rotation running through the centre of the cross. The projector tube 15 includes a light source 16, a cross-shaped diaphragm or graticule and one or more lenses, and is rotatable in a vertical bearing in the drive unit 13. It is coupled by spur gears 17 to the sleeve carrier 14 for the tracer wheel 12 in such manner that by rotating the tube 15 to adjust the rotary position of the cross-shaped projected image, the tracer wheel 12 is turned in the opposite direction about a vertical axis and at the same rate or to the same extent. The reason for this reversal follows from the fact that the tracer wheel rotates in the opposite direction compared with the known method of running the tracer wheel direct on the table.

Alternatively in place of the cross-projector tube 15 a photo-electric tracer system of known type may be used, as shown in Fig. 3. This comprises a rotary steering unit 151 coupled in a similar manner to the tracer carrier sleeve 14. The unit 151 carries a controlling light source and a photo-electric cell 152 which is conveniently mounted immediately over the table 2. The cell 152, through suitable control circuits known per se, effects the rotation of unit 151 so that the latter is set according to the direction of the drawing line to be used for controlling the cut. The details of the photo-electric tracer device are well known and form no part of the present invention and is not deemed necessary to describe this device in detail.

Although the cylinder 7 is shown as coaxial with and directly driving one pair of the wheels 6, the cylinder 7 may be offset and gearing may be interposed if desired; if the cylinder rotates in the opposite direction to the wheels 6, the coupling between the projector tube 15 or steering unit 151 is appropriately modified, e. g. by insertion of an idler wheel between the gears 17, to secure correct steering action.

It will be understood from the above description that the cutting burner can be guided over the workpiece to follow a path exactly similar to the lines of a drawing either manually by guiding the cross or similar device or automatically by the use of the photo-electric follower as shown in Fig. 3. It will be further understood that no damage will be done to the drawing as no mechanical device will be in contact therewith.

What I claim is:

1. An apparatus for profile and cutting in accordance with a drawing, comprising a table for supporting a drawing, a lower carriage having mobile supporting means including a supporting wheel mounted on said table for movement of said carriage longitudinally of said table, an upper carriage movably mounted on said lower carriage for movement transversely of said table, a cutter burner mounted on said upper carriage for movement therewith, steering means mounted on said upper carriage for rotation to follow a line on a drawing on said table and act as a tracing point, a steerable tracer wheel mounted for rotation on said upper carriage, means drivingly connecting said steering means and said tracer wheel for steering said tracer wheel in unison with said steering means, a cylinder rotatably mounted on said lower carriage and fixed against axial movement in relation thereto, said tracer wheel being spaced from said table to preclude engagement with a drawing on said table and being in peripheral driving engagement with said cylinder, and means drivingly connecting said cylinder with said supporting wheel to move said lower carriage in accordance with the drive transmitted by said tracer wheel, whereby said tracer wheel and cylinder cooperatively drive said carriages relative to each other and to said table under the control of said steering means.

2. A profile oxygen cutting machine, comprising a table for supporting a drawing, a lower carriage movably mounted on said table and having mobile supporting means including a pair of coaxial supporting wheels bearing on opposite sides of said table for movement longitudinally of said table, an upper carriage movably carried by said lower carriage for movement on said lower carriage transversely of said table, a cylindrical axle journalled on said lower carriage and fixed with said pair of supporting wheels, a positively driven steerable tracer wheel carried by said upper carriage and bearing on said cylindrical axle, a follower and a cutter-burner mounted in fixed relation to each other on the upper carriage, said follower being mounted so as to be capable of being steered along a line of a drawing on said table, and means linking said follower to said tracer wheel whereby said tracer wheel is steered to roll against said cylindrical axle to drive said upper carriage relative to said lower carriage and said lower carriage relative to said table in accordance with the direction of the line being followed.

References Cited in the file of this patent
UNITED STATES PATENTS

| Number | Name | Date |
|---|---|---|
| 1,921,887 | Schmidt | Aug. 8, 1933 |
| 2,207,787 | Eberle | July 16, 1940 |
| 2,261,644 | Cockrell | Nov. 4, 1941 |

FOREIGN PATENTS

| Number | Country | Date |
|---|---|---|
| 659,224 | Great Britain | Oct. 17, 1951 |
| 721,631 | France | Dec. 22, 1931 |